US006433146B1

(12) United States Patent
Cheryan

(10) Patent No.: US 6,433,146 B1
(45) Date of Patent: Aug. 13, 2002

(54) CORN OIL AND PROTEIN EXTRACTION METHOD

(75) Inventor: Munir Cheryan, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/313,690

(22) Filed: May 18, 1999

(51) Int. Cl.$^7$ .............................. C07K 1/14; C07K 1/34; C07K 1/36; C07K 14/425

(52) U.S. Cl. ..................... 530/373; 530/370; 530/412; 530/414; 530/418; 530/422; 530/424

(58) Field of Search ................................. 530/412, 414, 530/418, 422, 424, 370, 373

(56) References Cited

U.S. PATENT DOCUMENTS

| | | | |
|---|---|---|---|
| 3,962,335 A | 6/1976 | Kumar | 426/574 |
| 3,963,575 A | 6/1976 | Bulich | 195/31 R |
| 4,093,540 A | 6/1978 | Gupta | 210/23 |
| 4,224,219 A | 9/1980 | Van Blanton et al. | 260/112 G |
| 4,414,157 A | 11/1983 | Iwama et al. | 260/428.5 |
| 4,486,353 A | 12/1984 | Matsuzaki et al. | 260/412.4 |
| 4,545,940 A | 10/1985 | Mutoh et al. | 260/428 |
| 4,624,805 A | 11/1986 | Lawhon | 530/376 |
| 4,716,218 A * | 12/1987 | Chen et al. | 530/372 |
| 4,787,981 A | 11/1988 | Tanahashi et al. | 210/639 |
| 5,077,441 A | 12/1991 | Kuk et al. | 568/761 |
| 5,166,376 A | 11/1992 | Suzuki et al. | 554/10 |
| 5,254,673 A * | 10/1993 | Cook et al. | 530/373 |
| 5,310,487 A | 5/1994 | LaMonica | 210/651 |
| 5,342,923 A | 8/1994 | Takahashi et al. | 530/373 |
| 5,367,055 A | 11/1994 | Takahashi et al. | 530/373 |
| 5,410,021 A | 4/1995 | Kampen | 530/372 |
| 5,482,633 A | 1/1996 | Muraldihara et al. | 210/651 |
| 5,510,463 A | 4/1996 | Takahashi et al. | 530/373 |
| 5,545,329 A | 8/1996 | LaMonica | 210/651 |
| 5,580,959 A | 12/1996 | Cook et al. | 530/373 |
| 5,602,286 A | 2/1997 | Muralidhara | 568/816 |
| 5,773,076 A | 6/1998 | Liaw et al. | 426/656 |

OTHER PUBLICATIONS

Singh et al., 'Membrane Technology in Corn Wet Milling', Cereal Foods World, vol. 42, No. 7, pp. 520–525, Jul. 1997.*
Abstract of Funded Research, Fiscal Year 1997, (Cheyan, M. abstract No. 9701992) 1997, [on–line], [retrieved on Sep. 22, 2000]. Retrieved from the internet: <URL: http://www.reeusda.gov/nri/pubs/archive/abstracts/abstract97/contents.htm and http://www.reeu.*
N. Singh, M. Cheryan, "Extraction of Oil from Corn Distillers Dried Grains with Solubles", Transactions of the ASAE, vol. 41, No. 6, pp. 1–3 (1998).

M. Cheryan, Ultrafiltration and Microfiltration Handbook, Lancaster, PA; Technomic Publishing Co. 1998.

D. Chang, M.P. Hojilla–Evangelista, L.A. Johnson, D.J. Myers, "Economic–Engineering Assessment of Sequential Processing of Corn", Transactions of the ASAE, vol. 38, No. 4, 1995, pp. 1129–1138.

J.T. Chien, J.E. Hoff, L.F. Chen, "Simultaneous Dehydration of 95% Ethanol and Extraction of Crude Oil from Dried Ground Corn", Cereal Chem., vol. 65, No. 6, 1988, pp. 484–486.

J.T. Chien, J.E. Hoff, M.J. Lee, H.M. Lin, Y.J. Chen, L.F. Chen, "Oil Extraction of Dried Ground Corn with Ethanol", Chemical Engineering Journal, vol. 43, 1990, pp. B103–B113.

L.C. Dickey, M.F. Dallmer, E.R. Radewonuk, N. Parris, M. Kurantz, J.C. Craig, Jr., "Hydrocyclone Separation of Dry–Milled Corn", Cereal Chem, vol. 74, No. 5, 1997, pp. 676–680.

M.P. Hojilla–Evangelista, L.A. Johnson, D.J. Myers, "Sequential Extraction Processing of Flaked Whole Corn: Alternative Corn Fractionation Technology with Ethanol Production", Cereal Chem, vol. 69, No. 6, 1992, pp. 643–647.

N. Singh, M. Cheryan, "Membrane Technology in Corn Wet Milling", Cereal Foods World, vol. 42, No. 7, 1997, pp. 520–525.

"Membrane Technology in Corn Refining and Bioproduct –Processing", Starch/Stärke, vol. 50, No. 1, 1998, pp. 16–23.

V. Singh, S.R. Eckhoff, "Effect of Soak Time, Soak Temperature and Lactic Acid on Germ Recovery Parameters", Cereal Chem., vol. 73, No. 6, pp. 716–720. (1996).

* cited by examiner

Primary Examiner—Christopher S. F. Low
Assistant Examiner—Anish Gupta
(74) Attorney, Agent, or Firm—Greer, Burns & Crain, Ltd.

(57) ABSTRACT

The invention is a corn product removal process that successfully extracts oil and zein from dry-milled corn. Oils and zein are extracted from corn using ethanol. Corn solids are separated from the ethanol, oil and zein mixture produced in the step of extracting. Thereafter, the ethanol, oil and zein mixture are membrane filtered to restrain zein from the mixture and pass an oil and ethanol mixture. At least one of zein or oil is then selected to be separated for an output corn product.

13 Claims, 3 Drawing Sheets

CORN OIL AND PROTEIN EXTRACTION METHOD

FIELD OF THE INVENTION

The present invention generally concerns corn milling processes and machines. The invention specifically concerns multiple corn product milling processes and machines.

BACKGROUND OF THE INVENTION

There are two primary types of corn processing conducted presently, dry grind and wet milling processes. The wet milling processes are efficient in their use of corn since they produce numerous high value corn products, such as corn oil, starch, corn gluten meal, corn gluten feed, and corn steep liquor. However, the wet milling processes require very high capital investments in machinery. Dry grind processes are used to produce ethanol and animal feed. Animal feed is substantially less valuable than corn oil and zein, which are left in the animal feed produced by a dry mill process. A reason for existence of the dry grind plants to date has been government ethanol subsidies, which are likely to disappear.

Some methods to extract oil and zein from dry mill corn have been proposed in the literature, but have yet to demonstrate efficiency meeting commercial production requirements. One type of proposed method is embodied in U.S. Pat. No. 4,716,218 and a "Sequential Extraction Process" developed at Iowa State University. This type of method uses ethanol to extract oil and zein. Evaporation is required to remove the ethanol, and then hexane-extraction to separate the oil from the zein with further subsequent evaporation of the hexane from the oil. These are relatively complicated processes. They are also expensive due to their energy intensive nature. Significant heating requirements result from the multiple required evaporations. Further, the evaporations create pollution concerns.

Another proposed method to remove oil from dry-milled corn is mechanical degermination. This method produces corn germ with less than approximately 50 percent oil. The germ must be subsequently processed to recover the oil. No ability to recover zein is presented by this method, however, and there is no known utilization of the method to obtain corn oil and zein in a manufacture scaled product.

Thus, there is a need for an improved method capable of using dry grind corn, as well as wet milled corn product, to produce multiple corn products of value. It is an object of the invention to provide such a method. It is a further object of the invention to provide a method for extracting corn oil and protein, which method is capable of utilizing dry grind corn or wet milled corn product through ethanol treatment with filtration.

SUMMARY OF THE INVENTION

The method of the present invention obtains valuable oil and zein from various forms of corn to meet or exceed such needs. Membranes are relied up to filter valuable oils and proteins. Input to the corn process of the invention is corn of multiple forms. Ethanol is the only reagent utilized by the process, and conventional dry and wet mill plants therefore already provide the necessary reagent supply for implementation of the invention. The invention therefore serves as the basis for an add on technology to existing dry mill or wet mill plant, as well as the basis upon which new dry mill and wet plants may be constructed. Dry mill plants are likely to benefit the most from the invention, since the invention provides ways to extract more valuable corn oils and proteins from the corn while making use of the basic dry mill equipment and products of conventional dry mill plants.

A plant modified or constructed to implement the process of the invention uses high concentration ethanol, approximately 90–100% ethanol, to separate oil from the corn. The corn may be in any form, e.g., wet mill product, dry flakes, dry particles, or whole kernels. Alternatively or additionally, zein protein may be partially or substantially extracted using an ethanol extraction step with an ethanol concentration between approximately 60 and 90%. The ethanol solution containing the extracted product is separated from other corn solids by filtration or centrifugation. Synthetic semipermeable membranes are used to separate zein from the oil, producing relatively pure oil and/or pure zein. Additional membrane filtration is used to concentrate the oil and/or zein, and to recover the ethanol for further use in processing, if desired. Recycled ethanol may then be used in additional extraction of oil and/or zein, or may be used in a distillation operation if ethanol product is also being produced by the plant.

BRIEF DESCRIPTION OF THE DRAWINGS

Other features, objects and advantages of the invention will be apparent to those skilled in the art from the following detailed description and by reference to the drawings, of which.

DETAILED DESCRIPTION OF THE INVENTION

The invention extracts oil and/or zein from corn or corn processing by-products using ethanol, and relies upon membrane filtration to obtain high value oil and/or zein concentrate. The extraction is done in a continuous countercurrent, co-current or mixed flow extraction system. The sole reagent relied upon by the process is ethanol, which may be recycled for additional extraction or may be used to produce ethanol product.

Figure 1:
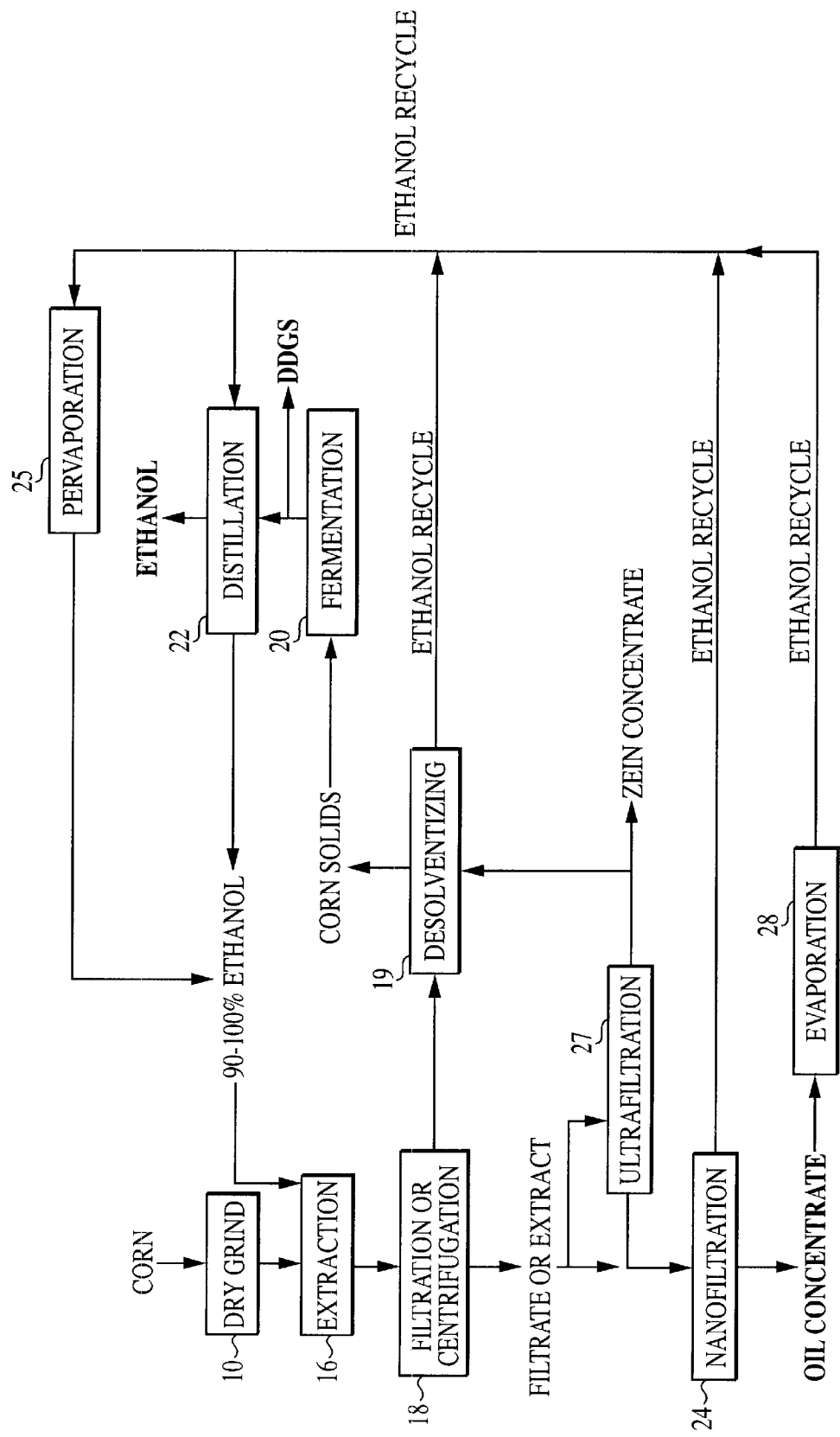
FIG. 1 illustrates corn oil production according to the principles of the present invention.

Referring now to FIG. 1, shown is a flow diagram of an oil concentrate extraction application of the invention to a dry mill ethanol plant. Corn or corn processing by-products are input to a dry grind processing step 10. The corn may be, for example, whole kernel or flaked corn. If corn processing by-products such as DDG or DDGS (distiller dried grains, with solubles) or corn gluten meal or corn germ or corn meal is used, this step 10 may not be necessary. In all cases, moisture content of feed material should be 0–14% by weight. The corn and ethanol are mixed in step 16 for extraction of oil. The temperature of extracting should be 50–90° C., preferably close to the boiling point of ethanol (78° C.) if 100% ethanol is used. The time of extraction should be 10–120 minutes, preferably 30 minutes if a batch extraction is done.

A mixing step prepares the corn for a preliminary extraction step 16. Small processing plants might use batch extraction, and larger plants could use continuous-counter current extraction. Oil extraction uses ethanol of between approximately 90–100% concentration, however, it is noted that extraction at around 90% ethanol is highly inefficient, and at least a 95% concentration is preferred. The ethanol is preferably supplied by the plant conducting the process of the invention, and, since it may be one of the corn products produced by application of the present process, a self sustaining supply is provided by the plant. No other reagent is required.

A separation step 18, e.g., filtration or centrifugation, is conducted to remove corn solids from an ethanol, zein, and oil mixture produced by the extraction step 16. The objective of the separation step is to remove substantially all suspended corn solids from the dissolved corn mixture of ethanol, oil and small portions of the ethanol-soluble protein zein. Some zein will not be extracted from the corn solids. If zein is a primary objective though, the ethanol concentration may be adjusted within the aforementioned 60–90% range to optimize zein extraction. Generally, ethanol concentrations in the higher end of the range will extract less zein than ethanol concentrations in the lower end of the range.

The separated corn solids from step 18 are subjected to a desolventizing step 19 to remove any ethanol that may be adsorbed in the corn solids. The ethanol recovered from desolventizing step 19 is recycled to the distillation section of the plant. The desolventized corn solids provide the necessary input for conventional ethanol production according to conventional techniques. Thus, in a plant embodying the invention, fermentation and distillation steps 20 and 22 are preferably conducted to produce an ethanol supply for the extraction step 16. Fuel ethanol and distillers dried grains with solubles (DDGS—an animal feed) may also be output as product from a plant modified or constructed to implement the invention.

The filtrate from step 18 containing oil, ethanol, and co-extracted components such as zein is then processed in a nanofiltration step 24 using a membrane to restrain oil while allowing ethanol to pass through. Corn oil has a molecular weight of about 800–900 daltons. Selection of an appropriate membrane is therefor straightforward. Nanofiltration membranes that are stable in ethanol, such as those made by Koch Membrane Systems, Osmonics-Desal or USFilter can be used. The retentate from this step is corn oil concentrate while the permeate containing ethanol is recycled back for extracting or processed further by distillation in step 22 or pervaporation in step 25.

If necessary, the filtrate from step 18 can be first passed through an ultrafiltration membrane 27 that will restrain the zein and other co-extracted components that are larger than the oil in molecular size. This ultrafiltration retentate can be further processed to produce zein as a product or be sent to step 19 for desolventizing and the zein recycled back to the ethanol production section. The ultrafiltration permeate now contains oil and ethanol which can go to the nanofiltration step 24 as described earlier.

The retentate of the nanofiltration operation in step 24 containing a concentrated oil in ethanol, may then be subjected to evaporation in step 28 to produce corn oil, while the ethanol vapors are recycled to the ethanol production section.

Depending on the moisture content of the corn and the manner in which the plant is operated, it is possible the ethanol extractant may absorb water during the extraction, filtration and membrane processing steps. This water must be removed from the ethanol recycle streams to maintain its effectiveness for extracting oil. This can be done either by distillation as, for example, in a separate distillation column or in the distillation section of the ethanol plant. Water can also be removed from the recycle ethanol stream by another membrane technology known as pervaporation in step 25. In any case, the ethanol must be adjusted to within 90–100% ethanol concentration prior to being used in the extraction step 16.

Figure 2:
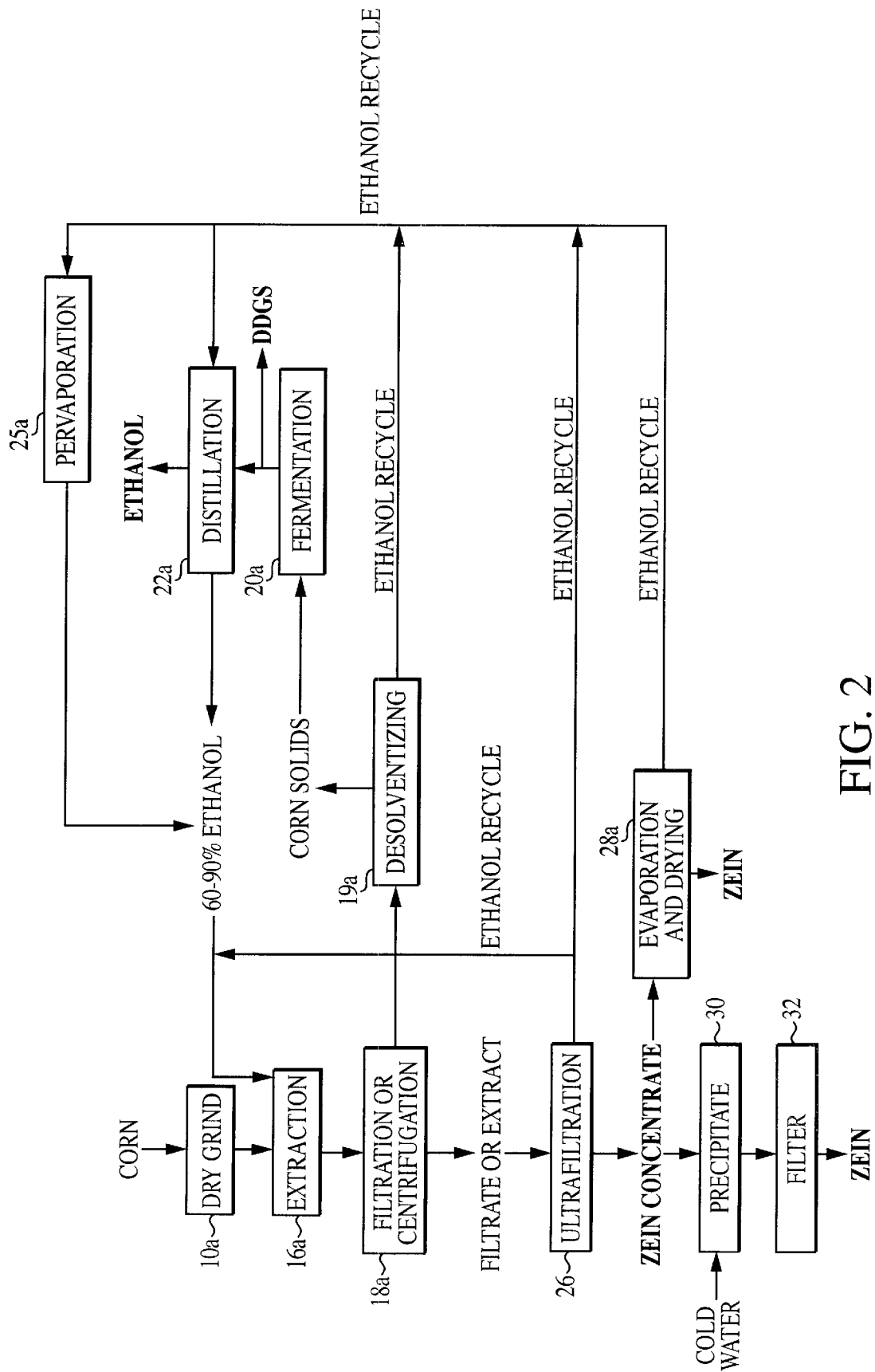
FIG. 2 illustrates zein production according to the principles of the present invention.

Referring now to FIG. 2, the process of the invention for a plant primarily focused on zein production is illustrated. Steps similar to those shown and discussed with respect to FIG. 1 are labeled with like reference numerals. The extraction step 16a uses a lower concentration extractant than that which is used in FIG. 1. The extractant should preferentially extract zein from corn but not oil. Ethanol concentrations in the range of 60–90% ethanol in water have been found effective, and a 70% ethanol, 30% water extractant solution is preferred. The corn and ethanol are mixed in step 16a for extraction of zein. The temperature of extraction should be 25–65° C., (preferably 50° C.) if 60–70% ethanol is used. The time of extraction should be 10–120 minutes, preferably 30 minutes if a batch extraction is done.

The extractant solution is obtainable from within the distillation section of the plant or by adding water to the output of the distillation step 22a. The filtration step 18a will separate other corn solids for processing, if desired, as discussed above. For example, the separated corn solids from step 18a are subjected to a desolventizing step 19a to remove any ethanol that may be adsorbed in the corn solids. The ethanol recovered from step 19a is recycled to the distillation section of the plant. The desolventized corn solids provide the necessary input for conventional ethanol production.

The filtrate from step 18a containing oil, ethanol, and co-extracted components such as a small quantity of oil that may be soluble at certain ethanol concentrations, is then processed in a membrane ultrafiltration step 26 to restrain zein while allowing ethanol to pass through. Zein proteins have molecular weights of about 12,000–40,000 daltons. Selection of an appropriate membrane with approximate molecular weight cut-offs of 5000 to 20,000 daltons is therefore straightforward. Ultrafiltration membranes that are stable in ethanol, such as those made by Koch Membrane Systems, Osmonics-Desal, Millipore or USFilter can be used. The retentate from the ultrafiltration step 26 is zein concentrate while the permeate containing ethanol is recycled back for extraction with make-up ethanol from the distillation section of the plant if needed, or processed further by distillation in step 22a or by pervaporation in step 25a.

The stream restrained by the membrane filtration step 26 contains concentrated zein in a 70% ethanol solution (if 70% ethanol/30% water was used for extraction). From this point, alternative steps can be used to further concentrate and purify the zein. A first alternative step is evaporation and drying step 28a. Ethanol-water vapors produced by step 28a may be sent for recovery by distillation step 22a, pervaporation step 25a or condensed directly for use in the extraction step 16a. A second alternative step is to send the zein and ethanol stream to a precipitation step 30, where zein is precipitated out. Adding cold water to reduce the ethanol concentration below 40% will cause the zein to precipitate out. A filtration step 32 then produces zein concentrate. Filtrate from this step containing ethanol-water is recycled for further extraction, fermentation or distillation, as discussed above with respect to FIG. 1.

Figure 3:
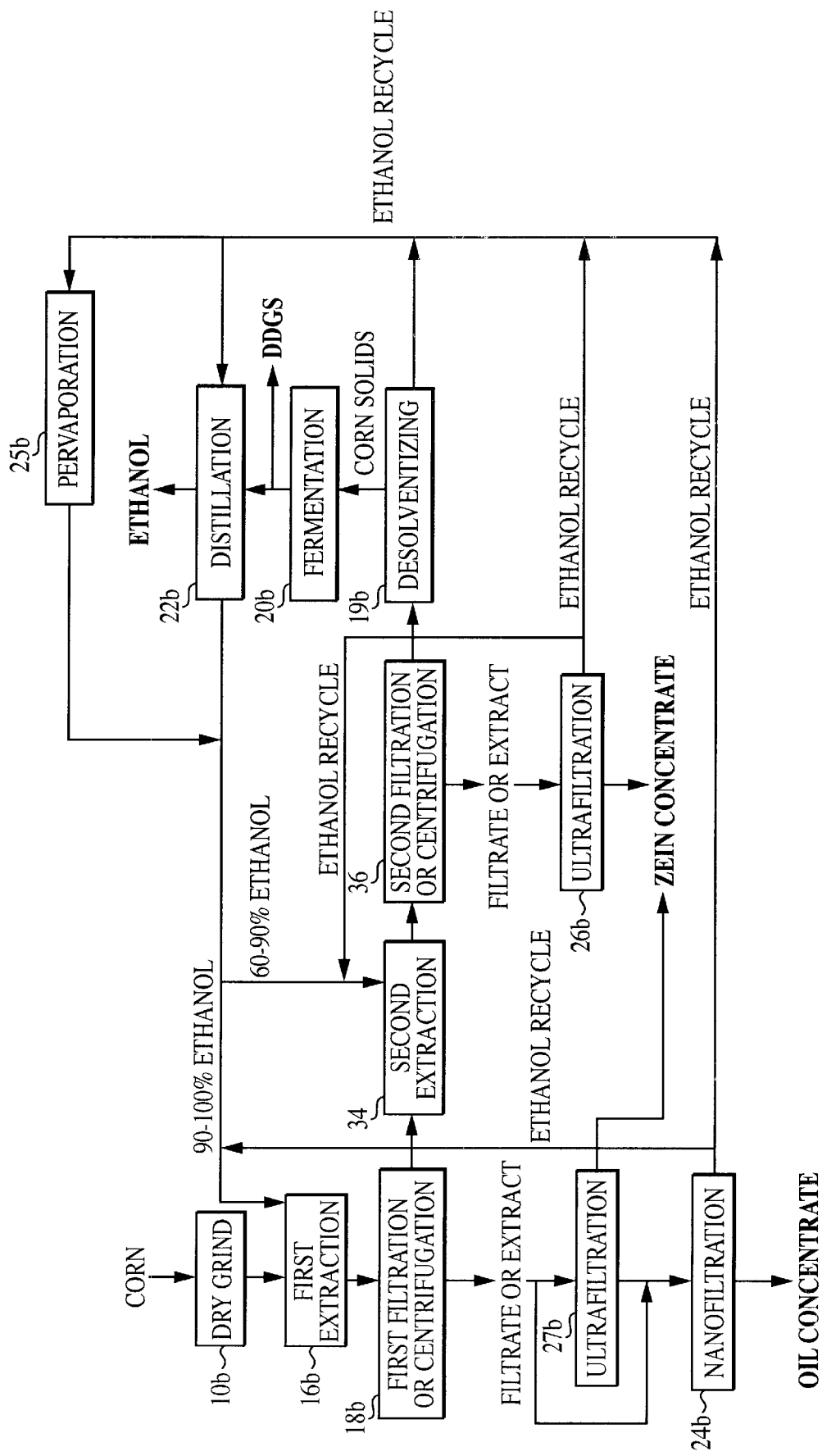
FIG. 3 illustrates combined oil and zein production according to the present invention.

FIG. 3 shows the process of the invention applied to a plant for production of both oil and zein, as well as ethanol and DDGS. The first extraction step 16b and first filtration step 18b are the same as in FIG. 1, with a 90–100% ethanol concentration used for oil extraction. The filtrate from 18b is subjected to a nanofiltration step 24b to produce an oil concentrate as described earlier for FIG. 1. Zein extraction is small, especially when concentrations of ethanol approach about 95% ethanol or more. If an amount of zein is significant, then an ultrafiltration step 27b could be conducted before step 24b as described earlier for FIG. 1.

The corn solids from 18b are extracted again in step 34 with a low concentration of ethanol in the range of 60–90%, preferably 70% ethanol/30% water as described for FIG. 2. Zein and ethanol-water obtained from a second filtration step 36 are processed by ultrafiltration step 26b and combined with any zein-alcohol retentate from the ultrafiltration step 27b. The permeate from step 26b is ethanol-water which proceeds as described for FIG. 2. In addition, the zein concentrate can be processed as described with regard to FIG. 2 to produce zein.

The invention therefore provides efficient, flexible and simple processes for production of corn products. The same production line may be used to maximize oil production or zein production. Zein and oil production may also be conducted in parallel fashion. Because the invention may process dry corn, as well as wet milled corn product, it provides the ability to achieve corn product production from dry mill plants used currently for ethanol production only. Reagent for extraction use in the extraction step(s) of the invention is regenerated or produced within the plant itself. Individual equipment components applied in the processes are modular and conventional, thus allowing straightforward modification of existing plants as well as construction of new plants.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A corn product removal process, the process comprising steps of:
    extracting oils and proteins from corn by subjecting the corn to an ethanol solution to thereby produce and extraction solution containing oils, corn solids, and zein protein;
    separating said corn solids from said extraction solution;
    membrane filtering said extraction solution after said step of separating said corn solids to restrain zein concentrate from said mixture and pass an oil and ethanol mixture;
    membrane filtering said oil and ethanol mixture to restrain oil concentrate and pass ethanol;
    selecting at least one of zein concentrate or oil separated in said membrane filtering steps for an output corn product,
    wherein said step of membrane filtering said extraction solution uses at least one ultrafiltration membrane,
    wherein said step of membrane filtering said oil and ethanol mixture uses at least one nanofiltration membrane, and
    wherein said step of extraction uses an ethanol solution having an ethanol concentration of between 60–100%.

2. The process of claim 1, wherein said step of selecting comprises selecting zein for output and further comprising a step of purifying said zein concentrate to obtain zein.

3. The process of claim 2, wherein said step of purifying comprises evaporating any ethanol and water from said zein concentrate.

4. The process of claim 2, wherein said step of purifying comprises precipitating zein.

5. The process of claim 4, wherein said precipitating comprises adding cold water to said zein concentrate to lower ethanol concentration below approximately 40 percent.

6. The process of claim 1, wherein said step of selecting comprises selecting oil for output and further comprising a step of purifying oil concentrate obtained in said step of membrane filtering said oil and ethanol mixture.

7. The process of claim 6, wherein said step of purifying comprises evaporating any ethanol and water from said oil concentrate.

8. The process 1, wherein said separating step comprises filtration.

9. The process of claim 1, wherein said separating step comprises centrifugation.

10. The process of claim 1, further comprising a step of removing the ethanol solvent from the corn solids by application of heat.

11. The process of claim 10, further comprising a step of recycling ethanol passed in said step of membrane filtering said oil and ethanol mixture into said step of extracting.

12. The process of claim 1, further comprising a step of recycling ethanol produced in any step back into said step of extracting.

13. The process of claim 1, wherein said corn is dry grind corn.

\* \* \* \* \*

UNITED STATES PATENT AND TRADEMARK OFFICE
CERTIFICATE OF CORRECTION

PATENT NO.    : 6,433,146 B1
DATED         : August 13, 2002
INVENTOR(S)   : Munir Cheryan It is certified that error appears in the above-identified patent and that said Letters Patent is hereby corrected as shown below:

<u>Column 5,</u>
Line 43, delete "and" insert -- an -- therefor

<u>Column 6,</u>
Line 39, insert -- separated -- before "corn solids" therefor

Signed and Sealed this

First Day of April, 2003

JAMES E. ROGAN
*Director of the United States Patent and Trademark Office*